United States Patent Office 3,392,001
Patented July 9, 1968

3,392,001
CATALYTIC CONVERSION OF CARBON MONOXIDE AND STEAM UNDER PRESSURE TO PRODUCE HYDROGEN
Ernst Lorenz, Ludwigshafen (Rhine), Ortwin Reitz, Heidelberg, and Franz Ludwig Ebenhoech, Ludwigshafen (Rhine), Germany, assignors to Badische Anilin- & Soda-Fabrik Aktiengesellschaft, Ludwigshafen (Rhine), Germany
No Drawing. Filed Feb. 4, 1965, Ser. No. 430,486
Claims priority, application Germany, Feb. 10, 1964, B 75,368
4 Claims. (Cl. 23—213)

ABSTRACT OF THE DISCLOSURE

A carbon monoxide conversion process using catalysts which consist of oxides and sulfides of transition elements of Groups V to VII of the Periodic System supported on oxide or silicate carriers and contain hydraulic cement binding agents.

---

This invention relates to a process for the catalytic reaction of carbon monoxide with steam to form carbon dioxide and hydrogen by means of catalysts which are consolidated with hydraulic binding agents.

It is already known that iron catalysts, which may optionally be provided with activators, such as chromium, or other additives, may be used for the reaction of carbon monoxide with steam to form hydrogen and carbon dioxide (CO-conversion).

It has also been proposed to convert gases containing carbon monoxide in the presence of catalysts which contain transition elements of Groups V to VII of the Periodic System and/or cobalt and/or nickel and which may be applied to carrier substances, such as alumina, silica gel and the like. These catalysts have the advantage that in the presence of hydrogen sulfide they are effective in many cases at lower temperatures than the iron oxide catalysts and at the same time cause a purification of the gas by hydrogenation for example of oxygen, oxides of nitrogen, unstable diolefins and undesirable polymers tending to form deposits.

It has been observed that when using high steam partial pressures, particularly with high carbon monoxide contents of the gas, the mechanical strength of the carriers used for these catalysts falls off to a more or less marked extent. Thus for example a catalyst consisting of cobalt sulfide and molybdenum sulfide on gamma-aluminum oxide may be used for several months at steam pressures up to 10 atmospheres and reaction temperatures of up to 450° C. without the mechanical strength falling below permissible limits. When however the steam pressure is for example 50 atmospheres and the reaction temperature is about 550° C., the strength of the same catalyst falls to one quarter of the original value after only a few days. At the same time the catalytic activity of the catalyst is unfavorable affected by a marked decrease in its internal surface which is associated with the said decline in mechanical strength.

We have now found that the reaction of carbon monoxide with steam to form carbon dioxide and hydrogen can be carried out particularly advantageously by using a catalyst composition which comprises (a) an oxidic or silicate carrier, (b) at least one compound selected from the group consisting of oxides or sulfides of transition elements of Groups V to VII of the Periodic System and/or cobalt and/or nickel and (c) a hydraulic cement as a binding agent. The catalysts according to this invention, although in many cases they have a smaller internal surface, are surprisingly superior in their activity in most cases to the prior art conversion catalysts; their resistance to steam is many times better than that of catalysts not containing binding agent.

Suitable oxidic or silicate carriers are the inorganic compounds conventionally used in the art, for example compounds of aluminum or magnesium with oxygen or oxygen and silicon, preferably $Al_2O_3$. In some cases, compounds of silicon with oxygen, e.g., $SiO_2$, may also be used as carriers.

The hydraulic binding agents may be commercially available cements, for example Portland cement, alumina cement or calcium aluminate, such as the cement "Secar 250" (Lafarge) obtainable in commerce. The amount of hydraulic binding agent (with reference to finished catalyst) may be from about 5 to about 50% by weight, advantageously from 20 to 30% by weight, and is dependent on the other components of the catalyst and on the strength desired.

The procedure in the production of the catalyst may be for example that the oxide or silicate carrier in finely ground form is kneaded successively or simultaneously with the various metal components in the form of salt solutions and the moist composition is dried and calcined; the ground roasted material is then mixed with cement and water and shaped.

In many cases it is advantageous to add water during the setting period and to carry out a drying after the setting period is over.

The production of the catalysts according to this invention is however not limited to the above procedure; instead of mechanical mixing of the carrier with the active components, for example coprecipitation and drying of all the components may be effected; drying of the moist composition may also be effected by spray drying. After having been mixed with cement and water, there is no limitation as regards shaping into tablets, extruded sections, rings, spheres and the like. The compressive strengths of the catalysts prepared in this way may be up to 700 kg./sq. cm. or more.

Catalysts according to this invention may be used in oxidic or sulfidic form. They have their maximum conversion activity in the sulfidic condition. Sulfurization of the active metal components may be carried out during the production of the catalysts or prior to the commencement of the conversion in the reactor itself, for example with gases containing hydrogen sulfide at elevated temperature. During operation, the catalytic activity is best when the gas to be converted has a minimum content of hydrogen sulfide or of organic sulfur compounds capable of reacting to form hydrogen sulfide.

Compared with the prior art catalysts, conversion with the catalysts according to this invention permits higher space velocities and carbon monoxide conversions. There are little or no limitations as regards the pressures and temperatures used. Thus for example carbon monoxide conversions of 5000 cu. m./cu. m. (S.T.P) per hour or more may be achieved at a total pressure of 100 atmospheres. As regards the conversion equilibrium it is advantageous with the catalysts according to this invention to use a two-stage or multi-stage method of operation, the first stage advantageously having the highest temperature and the last stage the lowest temperature and consequently the most favorable temperature from the equilibrium point of view.

A particularly advantageous difference between the prior art iron catalysts and the catalysts according to this invention resides in the fact that when their activity subsides (which may happen for example in the conversion of crude gases by deposition of tarry constituents or polymers) it is possible to regenerate the catalysts according to this invention in situ with mixtures of steam and air or of inert gas and air. The original activity is thus fully restored.

The following examples will further illustrate this invention.

EXAMPLE 1

50 kg. of gamma-alumina powder is placed in a mixer, 2.84 kg. of cobalt in the form of a solution of cobalt nitrate is added and the whole mixed uniformly for half an hour. Then 9.5 kg. of $MoO_3$ (dissolved in 8.3 liters of aqueous ammonia and 20 liters of water) is added and the whole kneaded for another hour. The moist material is then dried and calcined at 500° C. 10 kg. of the ground roasted material is mixed with 5 kg. of the cement "Secar 250" (Lafarge) which is commercially obtainable and 4 liters of water and press-molded into 10 mm. tablets. The moist tablets are soaked with water after twenty-four hours and another day later are dried at 200° C. The bulk density of the catalyst is 1.180 kg. per liter and the compressive strength, measured between the faces, is 700 kg./sq. cm.

The catalyst prepared in this way is treated with steam at 50 atmospheres pressure for one hundred hours at 575° C. The compressive strength of the exhausted catalyst is still 350 kg./sq. cm. The strength of an equivalent Co-Mo-$Al_2O_3$ catalyst which has not been consolidated with cement and whose original strength is 580 kg./sq. cm., falls to less than 100 kg./sq. cm. after an equivalent steam treatment.

EXAMPLE 2

A crude conversion gas having the composition given below is passed at a space velocity of 11,500 l./l./h. (dry feed gas) and a molar ratio of steam: carbon monoxide of 3:1 at a temperature of 455° C. and a total pressure of 100 atmospheres gauge over the catalyst of Example 1 which has been brought to a granulation of 3 to 5 mm. by breaking up the 100 mm. tablets and screening. Under the same reaction conditions and with the same gas, a commercially available iron catalyst having the same granulation is used in a parallel experiment. Analysis of the gas in each case after a period of operation of one hundred hours showed the following compositions:

| | Feed gas | Co-Mo-$Al_2O_3$-cement catalyst | Iron oxide-chromium oxide catalyst |
|---|---|---|---|
| $CO_2$, percent | 4.5 | 31.6 | 29.3 |
| CO, percent | 55.8 | 10.4 | 13.9 |
| $H_2$, percent | 38.2 | 56.9 | 55.7 |
| $N_2$, percent | 0.4 | 0.3 | 0.3 |
| $CH_4$, percent | 0.1 | 0.1 | 0.1 |
| $H_2S$, percent | 1.0 | 0.7 | 0.7 |

The alumina-cement catalyst is thus shown to be superior to the conventional iron catalyst.

EXAMPLE 3

A conversion crude gas having the composition given below and which, in addition to oxygen, contains 35 g. of condensable hydrocarbons per cubic meter (S.T.P.) is passed over the catalyst of Example 1 at a total pressure of 25 atmospheres at a space velocity of 1000 volumes of gas per volume of catalyst per hour. samples of gas are analyzed after two hundred and two thousand hours, with the following results (the gas composition being expressed as percentages, with the exception of $H_2S$ which is given as g./cu. m. (S.T.P.)):

| | Crude gas | After 200 hours | After 2,000 hours | After regeneration |
|---|---|---|---|---|
| $CO_2$ | 15.5 | 32.4 | 25.8 | 32.0 |
| CO | 32.6 | 6.3 | 16.5 | 6.9 |
| $H_2$ | 40.2 | 52.1 | 47.6 | 51.8 |
| $O_2$ | 0.3 | | | |
| $N_2$ | 1.2 | 1.0 | 1.1 | 1.0 |
| $C_nH_m$ | 0.5 | 0.4 | 0.5 | 0.4 |
| $CH_4$ | 9.7 | 7.8 | 8.5 | 7.9 |
| $H_2S$ | 7.5 | 6.0 | 6.6 | 6.1 |

The catalyst which, after operation for two thousand hours has declined in activity by deposition of coky polymers is regenerated by burning off the carbon with a mixture of steam and air at about 500° C. Analysis of the gas after the regenerated catalyst has been put into operation shows that the activity of the fresh catalyst is practically restored.

We claim:
1. In a method of converting carbon monoxide and steam under a total pressure of from 25 to 100 atmospheres to carbon dioxide and hydrogen wherein carbon monoxide in the presence of steam is placed in contact with a catalyst composition consisting essentially of
    (a) a catalyst carrier selected from the group consisting of oxidic and silicate compounds, and
    (b) at least one compound selected from the group consisting of a cobalt oxide, a cobalt sulfide, a nickel oxide, a nickel sulfide, an oxide of a transition element of Groups V to VII and a sulfide of a transition element of Groups V to VII of the Periodic System of Elements,
the improvement which comprises: carrying out said method in the presence of catalyst composition (a) plus (b) wherein said composition includes component (c), a hydraulic cement as a binding agent, the amount of said component (c) being from about 5 to about 50% by weight based on the total weight of the catalyst composition.

2. A method as in claim 1 wherein the amount of component (c) is from about 20 to about 30% by weight based on the total weight of the catalyst composition.

3. A method as in claim 1 wherein said catalyst composition is a Co-Mo-$Al_2O_3$ catalyst plus a hydraulic cement as a binding agent, the amount of said hydraulic cement being from about 5 to about 50% by weight based on the total weight of the catalyst composition.

4. A method as in claim 1 wherein said process is carried out at a total pressure of from 50 to 100 atmospheres.

References Cited

UNITED STATES PATENTS

| 1,330,772 | 2/1920 | Bosch | 23—213 |
| 1,896,240 | 2/1933 | Jaeger. | |
| 3,170,758 | 2/1965 | Honerkamp | 23—213 XR |
| 3,256,207 | 6/1966 | Arnold | 23—212 XR |

FOREIGN PATENTS 6,019   2/1932   Australia.

OSCAR R. VERTIZ, *Primary Examiner.*

EDWARD STERN, *Examiner.*